May 5, 1942.  W. E. KLEIN  2,281,846
STRAW CUTTER FOR GRAIN COMBINES
Filed June 15, 1940  3 Sheets-Sheet 1

Inventor
W. E. Klein
By John Rittenhouse
Attorney

May 5, 1942.    W. E. KLEIN    2,281,846
STRAW CUTTER FOR GRAIN COMBINES
Filed June 15, 1940    3 Sheets-Sheet 2
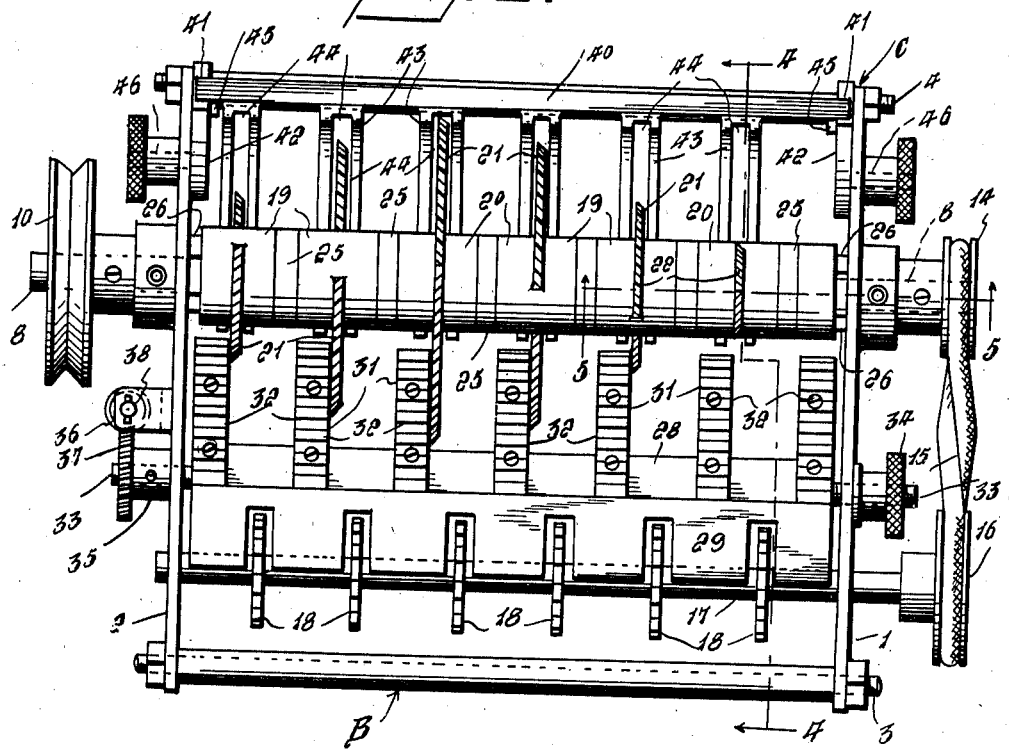
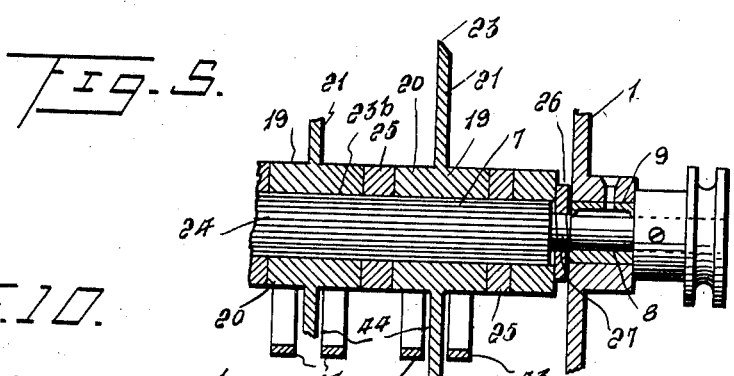
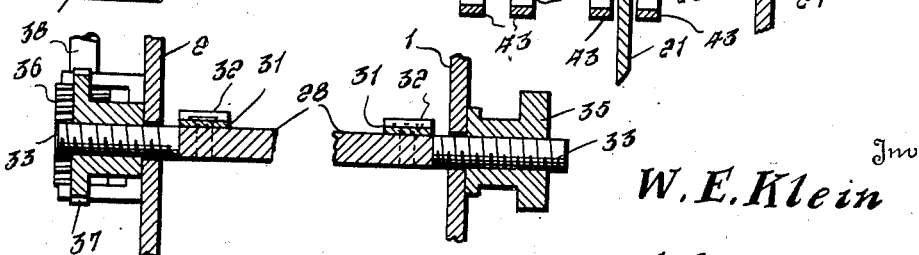
Inventor
W. E. Klein May 5, 1942.                W. E. KLEIN                2,281,846
                   STRAW CUTTER FOR GRAIN COMBINES
                      Filed June 15, 1940          3 Sheets-Sheet 3
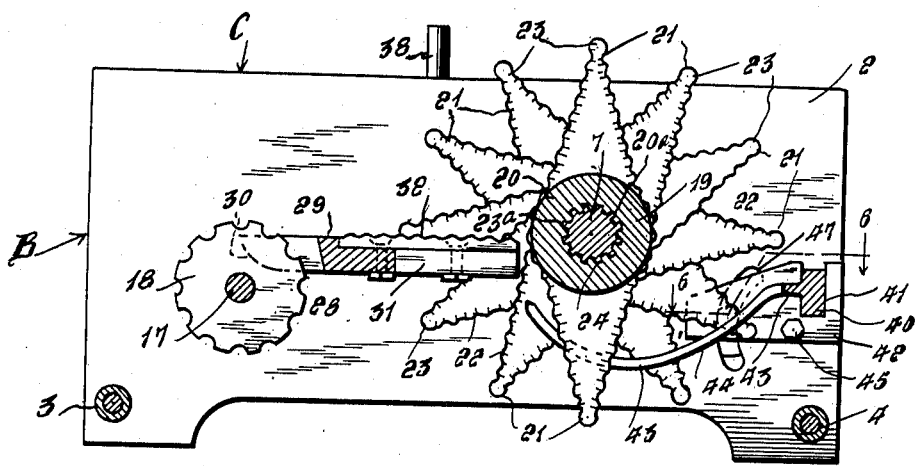
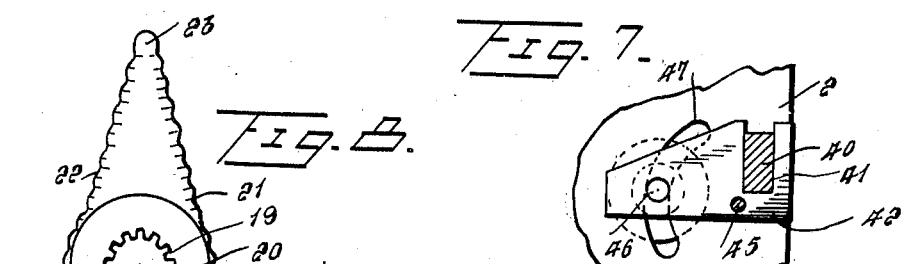
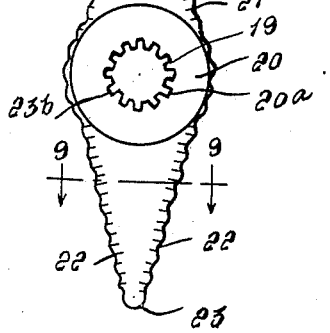
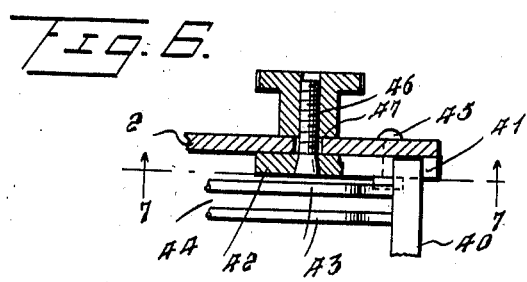
Inventor
W. E. Klein Patented May 5, 1942

2,281,846

UNITED STATES PATENT OFFICE 2,281,846

STRAW CUTTER FOR GRAIN COMBINES

William E. Klein, Pontiac, Ill.

Application June 15, 1940, Serial No. 340,828

5 Claims. (Cl. 130—27)

This invention relates to new and useful improvements in straw cutters for grain combines, and is designed for use in connection with any combined used for threshing small grain, such as wheat, oats, beans, barley, flax, etc.

No successful device has yet been devised and placed on the market for distributing the straw on the ground after the grain has been separated from the straw by the combine. The result is that stocks are thrown from the machine at a given time and deposited on the ground in piles through which the farmer cannot run a plow. There is a device called a spreader which is attached just under the straw racks on most machines. However, when the growth of the straw is abundant and especially when the weather is wet, the spreader will not operate successfully and becomes clogged with long and wet straw, thus necessitating the use of a knife or other instrument to remove the same. The result is that great quantities of straw are deposited at a time and the only successful method whereby the farmer may dispose of this accumulation is by burning, which robs the soil of a part of its fertility, whereas the stock should be returned to the soil from which it came.

The primary object of my present invention is to provide a straw cutter for grain combines, whereby the straw may be cut into suitable lengths, in order that the same may be evenly spread on the ground by the spreader and not interfere with plowing.

A further object of my invention is to provide a straw cutter of novel construction that may be adjusted to meet any condition or type of grain straw.

A still further object of my invention is to provide a straw cutter in which the stationary cutting blades may be adjusted to work closer to or farther from the co-acting rotary cutting knives.

Still another object of my invention is to provide means for tilting or adjusting the horizontal cutting blades at the desired adjustment or angle.

Another object of my invention is to provide a novel cleaning device for the rotary cutting knives.

Yet still another object of my invention is to provide a straw cutter for grain combines that is simple and economical in construction, may be easily and readily installed, and is highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 3 is an enlarged plan view of the straw cutter.

Figure 4 is a vertical transverse section, taken on line 4—4 of Figure 3.

Figure 5 is a longitudinal section, taken on line 5—5 of Figure 3.

Figure 6 is a detail horizontal section, taken on line 6—6 of Figure 4.

Figure 7 is a vertical transverse section, taken on line 7—7 of Figure 6.

Figure 8 is an enlarged detail face view of one of the rotary cutting knives.

Figure 9 is a horizontal section, taken on line 9—9 of Figure 8, and Figure 10 is a fragmentary sectional view of the shaft carrying the stationary cutting blades.

Figure 1:
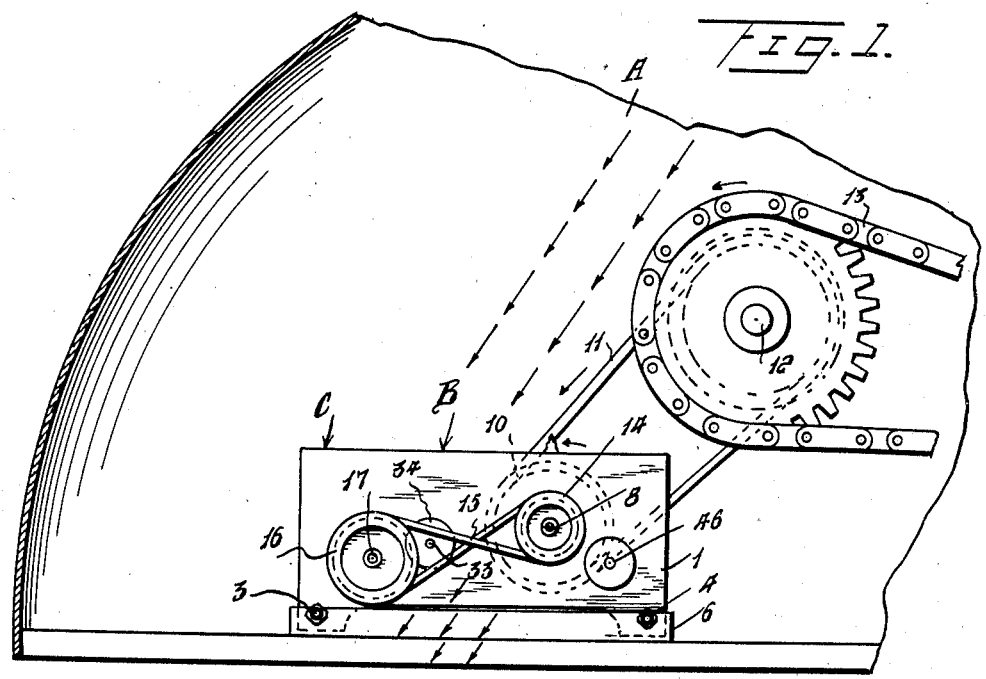
Figure 1 is a fragmentary sectional view of the rear end of a grain combine for small grain, of any ordinary or approved construction, illustrating the application of my invention.
Figure 2:
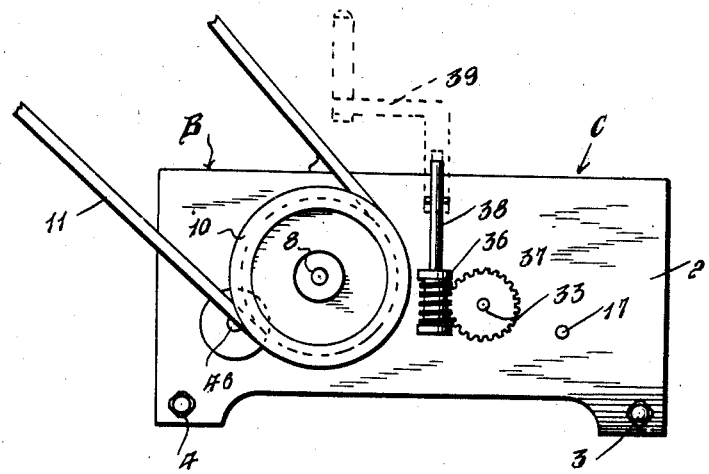
Figure 2 is an elevational view of my improved straw cutter, looking from the opposite side of the machine.

Referring to the drawings for a more particular description of my invention, and in which drawings like parts are designated by like reference characters throughout the several views, A designates a grain combine of any ordinary or approved construction, for threshing small grain, such as wheat, oats, barley, flax and the like and B my improved straw cutter, as a whole.

Specifically, my improved straw cutter comprises a suitable supporting frame C, consisting of the corresponding rectangular oblong end plates or members 1 and 2, connected together at their lower ends by the front and rear cross rods 3 and 4 and adapted to be attached to the hood 5 of the combine by the angle irons 6.

A transverse shaft 7 extends between the end plates 1 and 2 and is provided at opposite ends with the trunnions 8, which are journaled in the bushings 9. One end of the shaft 7 is provided with a V-shaped pulley 10, over which passes a belt 11, connected with the rear shaft 12 of the straw rack or carrier 13. It is by this means that power is derived for driving the shaft 7. The opposite end of the transverse shaft 7 is equipped with a smaller grooved pulley 14, from which power is transmitted by means of the cross belt and pulley 15 and 16, respectively, to the agitator shaft 17. The agitator shaft is provided with a series of longitudinally spaced notched or sprocket like wheels 18, which agitate and tend to feed the straw to the cutting mechanism.

The cutting mechanism comprises a plurality of rotary cutting knives 19, each consisting of the central cylindrical hub 20, formed with the oppositely extending V-shaped integral blades 21, serrated at both edges, as at 22, along their entire margins, except at their extreme outer ends or points 23. By constructing the cutting knives in this way, the same may be reversed and will have twice the life otherwise possible. The bores 20$^a$ of the hubs 20 are grooved, as at 23$^b$, to receive the splines 24 of the shaft 7, and the cutting knives 19 are arranged on the shaft 7 in staggered relation with respect to each other. The hubs 20 of the rotary cutting knives 19 are spaced equi-distances apart on the shaft 7 by the spacing rings or sleeves 25, and the knives and sleeves are held in assembled position on the shaft by the lock nuts 26, screwing on the inner threaded ends, as 27, of the trunnions 8. By casting the cylindrical hubs and knives in individual units, it is very easy to replace a knife if damaged or broken in use.

A horizontal blade supporting bar 28, having a flat upper surface 29 and beveled lower front edge 30, is mounted in the frame C behind the shaft 7. The aforesaid bar 28 is formed at its front edge with a plurality of transversely spaced forwardly extending lugs or fingers 31, to which are fastened the flat removable cutting blades 32. The cutting blades 32 co-act with the rotary cutting knives 19, and the adjacent edges of the cutting blades may be moved closer to or farther from the cutting knives by adjusting the bar 28 in the frame C. This is made possible by forming the ends of the bar with the threaded stems 33 to receive the cylindrical nuts 34 and 35. The bar 28 may be oscillated to tilt or adjust the cutting blades 32 to the desired angle or inclination by means of the worm 36 and intermeshing pinion 37. The worm 36 is provided with the shaft 38 adapted to be engaged by the crank 39. The cutting blades 32 may thus be adjusted to meet any condition of the grain or may be opened to such an extent that the straw will pass through as delivered without cutting.

In carrying out my invention, a cleaning device is mounted in the supporting frame C in front of the rotary cutting knives 19, and is for the purpose of removing any straw that may attach itself to the latter. The cleaning device comprises the horizontal bar 40, whose opposite ends fit in the front slotted ends 41 of the brackets 42. The horizontal bar 40 is provided with an integral downwardly and rearwardly curved apron 43, formed with transverse slots 44 to receive the rotary cutting knives, as shown. It will be noted that the front ends of the brackets 42 are pivoted, as at 45, to the end plates 1 and 2 of the frame C, while their opposite ends carry the threaded studs or screws 46, which work in the arcuate slots 47 in the end plates. By this means, the rear end of the apron 43 may be swung up or down in the arc of a circle, as desired, to attain the best possible results under all conditions.

In practice, the straw passes over the rear end of the straw rack or conveyor 13, and then downwardly in the direction indicated by the arrows in Figure 1 of the drawings to the straw cutter. After the straw is cut into the proper lengths, it passes downwardly to the spreader.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claims.

Having described my invention, what I claim as new and desire to secure by Letters Patent, is:

1. In a straw cutter for grain combines, a supporting frame, a plurality of rotary cutting knives mounted in said supporting frame, stationary cutting blades co-acting with said rotary cutting knives, an agitator mounted in the supporting frame behind said cutting blades, a cleaning device for said rotary cutting knives, said cleaning device comprising a downwardly and rearwardly curved apron with transverse slots to receive the corresponding knives and means for raising and lowering the rear end of said apron.

2. In a straw cutter for grain combines, a supporting frame, a plurality of rotary cutting knives, mounted in said frame, each of said cutting knives comprising a cylindrical hub formed with oppositely extending V-shaped blades, stationary cutting blades co-acting with said rotary cutting knives, an agitator mounted in the supporting frame behind said cutting blades, a cleaning device for said rotary cutting knives, said cleaning device comprising a downwardly and rearwardly curved apron with transverse slots to receive the corresponding knives and means for raising and lowering the rear end of said apron.

3. In a straw cutter for grain combines, a supporting frame, a plurality of rotary cutting knives, mounted in said frame, each of said cutting knives comprising a separate cylindrical hub formed with oppositely extending V-shaped serrated blades, stationary cutting blades co-acting with said rotary cutting knives, an agitator mounted in the supporting frame behind said cutting blades, a cleaning device for said rotary cutting knives, said cleaning device comprising a downwardly and rearwardly curved apron with transverse slots to receive the corresponding knives and means for raising and lowering the rear end of said apron.

4. In a straw cutter for grain combines, a supporting frame, a plurality of rotary cutting knives, mounted in said frame, a horizontal blade supporting bar, provided with a plurality of transversely spaced forwardly extending lugs, mounted in said supporting frame, flat removable cutting blades fastened to the lugs of said supporting bar and co-acting with said rotary cutting knives, an agitator mounted in the supporting frame behind said cutting blades, a cleaning device for said rotary cutting knives, means for driving said rotary cutting knives and agitator, means for adjusting the blade supporting bar and cutting blades toward or from the rotary cutting knives and means for oscillating the blade supporting bar to tilt the cutting blades to the desired inclination or angle.

5. In a straw cutter for grain combines, a supporting frame, a plurality of rotary cutting knives, mounted in said frame, a horizontal blade supporting bar, provided with a plurality of transversely spaced forwardingly extending lugs, mounted in said supporting frame, flat removable cutting blades fastened to the lugs of said supporting bar and co-acting with said rotary cutting knives, an agitator mounted in the supporting frame behind said cutting blades, a cleaning device for said rotary cutting knives, means for driving said rotary cutting knives and agitator, means for adjusting the blade supporting bar and cutting blades toward or from the rotary cutting knives and means including a worm shaft and pinion for oscillating the blade supporting bar to tilt the cutting blades to the desired inclination.

WILLIAM E. KLEIN.